United States Patent [19]

Dumbaugh, Jr.

[11] Patent Number: 5,342,426
[45] Date of Patent: Aug. 30, 1994

[54] MAKING GLASS SHEET WITH DEFECT-FREE SURFACES AND ALKALI METAL-FREE SOLUBLE GLASSES THEREFOR

[75] Inventor: William H. Dumbaugh, Jr., Painted Post, N.Y.

[73] Assignee: Corning Incorporated, Corning, N.Y.

[21] Appl. No.: 92,474

[22] Filed: Jul. 16, 1993

[51] Int. Cl.$^5$ ............................................. C03C 23/00
[52] U.S. Cl. ........................................... 65/23; 65/31; 65/90; 65/121; 156/657; 156/663; 501/75; 501/49; 501/52
[58] Field of Search ............... 65/23, 31, 90, 121; 156/663, 657, 630, 155; 501/75, 49, 52

[56] References Cited

U.S. PATENT DOCUMENTS

| | | |
|---|---|---|
| 3,338,696 | 8/1967 | Dockerty . |
| 3,673,049 | 6/1972 | Giffen ..................... 65/41 |
| 3,682,609 | 8/1972 | Dockerty . |
| 4,102,664 | 7/1978 | Dumbaugh . |
| 4,824,808 | 4/1989 | Dumbaugh . |
| 4,880,453 | 11/1989 | Coppola et al. . |
| 5,100,452 | 3/1992 | Dumbaugh . |
| 5,116,787 | 5/1992 | Dumbaugh . |
| 5,116,788 | 5/1992 | Dumbaugh . |
| 5,116,789 | 5/1992 | Dumbaugh et al. . |

FOREIGN PATENT DOCUMENTS 0033221 2/1985 Japan ........................... 65/23

*Primary Examiner*—W. Gary Jones
*Assistant Examiner*—John Hoffmann
*Attorney, Agent, or Firm*—C. S. Janes, Jr.

[57] ABSTRACT

This invention is directed to a method for preparing glass sheet having surfaces which are essentially defect-free and equivalent in smoothness to polished glass surfaces which comprises the steps of: Two different batches of alkali-metal-free batches are melted and formed into a laminated sheet and the first glass is enclosed by the second glass. The second glass is 1000 times more soluble than the first glass. The laminate is contacted with an acid to dissolve the second glass wherein the first glass remains with essentially defect free surfaces.

6 Claims, No Drawings

MAKING GLASS SHEET WITH DEFECT-FREE SURFACES AND ALKALI METAL-FREE SOLUBLE GLASSES THEREFOR

BACKGROUND OF THE INVENTION

This invention relates to the fabrication of glass sheet prepared from glasses exhibiting high strain points for use in applications requiring glass sheet of precision flatness and exhibiting defect-free surfaces. One particular application for this invention is the production of glass substrates for use in liquid crystal display (LCD) devices. The fabrication of such devices has been extensively discussed and the details of their operation explained in both the patent and scientific literature. U.S. Pat. No. 5,116,787 (Dumbaugh, Jr.) is illustrative of such literature.

As is explained in that patent, glass has been chosen as a substrate in liquid crystal display devices for at least three basic reasons: first, it is transparent; second, it can withstand the chemical and physical (including thermal) conditions to which it is exposed during display processing; and, third, it can be produced at reasonable cost in thin sheets with precisely controlled dimensions. Liquid crystal displays are passive displays which are dependent upon external sources of light for illumination. They are fabricated as segmented displays or in one of two basic matrix configurations. The substrate needs of the two matrix types differ. The first type is intrinsic matrix addressed, relying upon the threshold properties of the liquid crystal material. The second type is extrinsic or active matrix addressed in which an array of diodes, metal insulator-metal devices, or thin film transistors (TFTs) supplies an electronic switch to each pixel. In both designs, however, two sheets of glass comprise the structure of the display.

As is discussed in that patent, intrinsically addressed liquid crystal displays are fabricated at relatively low temperatures, viz., $\leq 350°$ C. Accordingly, soda lime silicate glass sheet having a silica barrier layer thereon to prevent migration of Na+ ions has been employed extensively as substrates therefor. A high performance version of intrinsically addressed liquid crystal displays, denoted the super twisted nematic, added to the substrate the requirement of extremely precise flatness. That requirement has mandated that the soda lime silicate glasses utilized in those displays be polished. Alternatively, Corning Code 7059 glass, a barium boroaluminosilicate glass marketed by Corning Incorporated, Corning, N. Y., which is precision formed into sheet requiring no surface polishing using the downdraw fusion pipe, such as is disclosed in U.S. Pat. Nos. 3,338,696 (Dockerty) and 3,682,609 (Dockerty), has been employed.

Extrinsically addressed liquid crystal displays can be subdivided into two categories: the first founded in metal-insulator-metal or amorphous silicon (a-Si) devices; and the second founded in polycrystalline silicon (poly-Si) devices. Because devices formed from poly-Si are processed at substantially higher temperatures than those employed with a-Si thin film transistors, glass compositions having strain points higher than soda lime silicate glasses and Corning 7059 glass (strain point of 593° C.) have been demanded in order to prevent thermal deformation of the sheet during processing and to prevent stress buildup. The practical solution to the problem was to formulate glass compositions exhibiting high strain points such that dimensional change during processing at temperatures above about 600° C. will be minimized. The use of glasses exhibiting strain points in excess of 600° C. can eliminate the need for careful annealing thereof when used in the fabrication of the relatively low temperature a-Si devices. Moreover, contamination of the thin film transistors by alkali metal migrating from the glass surface has been a recognized concern, which concern has resulted in the use of coatings to provide barrier layers on the substrate. Accordingly, recent glass composition research has been directed to the use of alkali metal-free glass compositions for use as substrates. And the great proportion of that research has been directed to the formulation of glasses having strain points higher than 600° C., preferably higher than 625° C., and most preferably higher than 650° C. Furthermore, because of the desire to eliminate the need for surface polishing, glass compositions have been sought which can be precision formed utilizing the above-mentioned downdraw fusion pipe. Glasses satisfying those criteria have been developed in the alkaline earth metal aluminosilicate system which are essentially free of alkali metal oxides and may desirably contain boron oxide. The following disclosures are illustrative of the research for glass compositions suitable for the manufacture of sheet glass for LCD devices.

U.S. Pat. No. 4,824,808 (Dumbaugh, Jr.) describes glasses consisting essentially, expressed in terms of cation percent, of 52–58% $SiO_2$, 12.5–18% $Al_2O_3$, 20–23% $B_2O_3$, 0–4% MgO, 0–6% CaO, 0–6% SrO, 1–9% BaO, 8–12% MgO+CaO+SrO+BaO, 0–3% ZnO, and 0–1% fining agents. The glasses exhibit strain points in excess of 625° C., a linear coefficient of thermal expansion (25°–300° C.) of 20–60×10$^{-7}$/°C., and a weight loss in 5% HCl at 95° C. not exceeding 10 mg/cm$^2$ after 24 hours.

U.S. Pat. No. 5,116,787 (Dumbaugh, Jr.) reports glass compositions essentially free of MgO and alkali metal oxides and consisting essentially, expressed in terms of mole percent, of 63–68% $SiO_2$, 7.5–11% $Al_2O_3$, 9.5–16% CaO, 0–5% SrO, 4.5–10% BaO, 14–26% CaO+SrO+BaO, and 1–7% $B_2O_3$. The glasses demonstrate strain points of at least 655° C., linear coefficients of thermal expansion (25°–300° C.) between about 35–50×10$^{-7}$/°C., and excellent resistance to attack by 5% HCl at 95° C. after 24 hours.

U.S. Pat. No. 5,116,788 (Dumbaugh, Jr.) records glass compositions essentially free from alkali metal oxides and consisting essentially, expressed in terms of mole percent, of 60–65% $SiO_2$, 8–10% $Al_2O_3$, 1–4% $B_2O_3$, 11–24% CaO, 0–4% MgO, 0–12% SrO, 0–9% BaO, 23–28% CaO+MgO+SrO+BaO. The glasses display strain points in excess of 675° C. and a weight loss in 5% HCl at 95° C. of less than 1 mg/cm$^2$ after 24 hours.

U.S. Pat. No. 5,116,789 (Dumbaugh, Jr. et al.) is drawn to glass compositions essentially free from MgO and alkali metal oxides and consisting essentially, expressed in terms of mole percent, of 65–75% $SiO_2$, 6–10% $Al_2O_3$, 15–26% SrO, 0–10% CaO and/or BaO, 0–5% $B_2O_3$, and 0–12% $B_2O_3$+[CaO and/or BaO]. The glasses exhibit strain points higher than 675° C., linear coefficients of thermal expansion (25°–300° C.) between about 35–65×10$^{-7}$/°C., and excellent resistance to attack by 5% HCl at 95° C. after 24 hours.

U.S. Ser. No. 08/8,560, filed Jan. 23, 1993 under the title HIGH LIQUIDUS VISCOSITY GLASSES FOR FLAT PANEL DISPLAYS by W. H. Dumbaugh, Jr.

and J. C. Lapp and assigned to the same assignee as the present application, refers to glass compositions essentially free from alkali metal oxides and consisting essentially, expressed in terms of mole percent, of 64–70% $SiO_2$, 9.5–12% $Al_2O_3$, 5–10% $B_2O_3$, 0–5% $TiO_2$, 0–5% $Ta_2O_5$ 0–5% MgO, 3–13% CaO, 0–5.5% SrO, 2–5.5% BaO, and 10–20% MgO+CaO+SrO+BaO. The glasses demonstrate strain points in excess of 650° C., linear coefficients of thermal expansion (0°–300° C.) between 32–46×$10^{-7}$/°C., and a weight loss in 5% Hcl at 95° C. of less than 2 mg/$cm^2$ after 24 hours.

U.S. Ser. No. 08/61,459, filed May 17, 1993 under the title BARIUM ALUMINOSILICATE GLASSES by W. H. Dumbaugh, Jr. and J. C. Lapp and assigned to the same assignee as the present application, discusses glass compositions essentially free from alkali metal oxides and consisting essentially, expressed in terms of mole percent, of 65–76% $SiO_2$, 7–11% $Al_2O_3$, 12–19% BaO, 0–5% $B_2O_3$, 0–5% MgO, 0–10% CaO, 0–10% SrO, 0–15% MgO+CaO+SrO, 0–2.5% $ZrO_2$ 0–3% $TiO_2$, 0–3% $Ta_2O_5$, 0.5–5% $ZrO_2$+$TiO_2$+$Ta_2O_5$. The glasses display strain points higher than 660° C., linear coefficients of thermal expansion (0°–300° C.) between about 45–55×$10^{-7}$/°C. and a weight loss in 5% HCl at 95% of less than 0.5 mg/$cm^2$ after 24 hours.

Although glass sheet formed utilizing the downdraw fusion pipe requires no surface polishing as drawn, subsequent handling and shipping can result in injuring the surface of the sheet. Consequently, various measures have been taken to protect the glass surface from abuse until the sheet is ready for use in a particular application. For example, sheets of paper and other materials have been interleaved with the glass sheets during stacking for shipping to prevent glass-to-glass contact. As can be appreciated, that practice entails a separate step in the overall process with additional costs, and demands a high degree of care not only in the interleaving procedure as the sheets are being stacked for shipment, but also when the sheets are withdrawn from the stack.

SUMMARY OF THE INVENTION

The principal objective of the invention was to devise means to assure the protection from surface abuse of glass sheets prepared from compositions exhibiting high strain points designed for use in applications where flatness of great precision is mandated, that means not requiring an extra step in the stream of production. The invention was particularly designed for use in the fabrication of sheet to be used in the formation of LCD devices. In broadest terms, the inventive method comprises cladding a sheet of a durable glass with a thin layer of a soluble glass during a forming process. Thereafter, the laminate can be cut, shipped, and otherwise handled with any resulting surface abuse being absorbed by the layer of soluble glass. The soluble glass protects the surface of the durable glass during forming, thereby imparting a polished surface on the durable glass without the necessity for grinding and polishing. At the time the sheet is to be used, the soluble glass layer is chemically removed leaving a defect-free surface.

As was observed above, the preparation of glass sheet to be utilized in the formation of substrates for LCD devices has preferably involved utilizing the downdraw fusion pipe because no surface polishing is required. And that method is still the most preferred. Nevertheless, the present invention enables other sheet forming processes to be employed, e.g., updraw and slot draw processes. Whereas such other sheet forming practices can result in imprecise flatness and surface defects, after coating with a soluble glass the laminated sheet can be flattened and the surface defects removed therefrom at elevated temperatures.

U.S. Pat. No. 4,102,664 (Dumbaugh, Jr.) presents an extensive discussion of preparing glass articles exhibiting defect-free surfaces which can be equivalent in smoothness to those produced through grinding and polishing. The method described therein consisted of five basic steps:

(1) two glass forming batches of different compositions are melted, one batch for a glass which is highly soluble in a given solvent, and a second batch for a glass that is relatively insoluble in the same solvent;

(2) the molten glasses are brought together while in the liquid state, i.e., at viscosities no greater than about $2.5 \times 10^5$ poises ($2.5 \times 10^4$ Pa.s), to form a laminated glass body wherein the insoluble glass is essentially enveloped within the soluble glass;

(3) the glass layers are fused together at a temperature at which they are sufficiently fluid to provide a defect-free interface therebetween;

(4) the laminated article is cooled; and subsequently (5) the soluble glass layer is dissolved away in an appropriate solvent.

The patent disclosed three general families of glass compositions suitable for use as the relatively insoluble glasses, viz., alkali metal aluminosilicate glasses, alkali metal zinc silicate glasses, and alkali metal, alkaline earth metal silicate glasses. The patent cited four general families of soluble glasses. (As explained in the patent, the soluble glasses were at least 10 times, more preferably at least 100 times, more soluble in a particular solvent than the relatively insoluble glass.) The named soluble glasses were alkali metal silicate glasses, various metaphosphate-type glasses, barium borosilicate glasses, and various borate-based glasses.

U.S. Pat. No. 4,880,453 (Coppola et al.) discloses a modification of the basic process described by Dumbaugh, Jr. Thus, Coppola et al. were desirous of protecting the surface of soda lime glass articles. Because the glass compositions utilized by Dumbaugh, Jr. did not demonstrate the necessary combination of melting and forming characteristics to be useful as cladding glasses for soda lime glass articles, Coppola et al. devised glass compositions expressly designed for that purpose. Those glass compositions consisted essentially, expressed in terms of weight percent, of 0.7–7.5% $Li_2O$, 18–27% PbO, ≦32% $Li_2O$+PbO, 35–50% BaO, 0–5% $Na_2O$, 0–5% $K_2O$, 0–7% $Na_2O$+$K_2O$, 0–5% $Al_2O_3$ 3–0–50% $B_2O_3$, and 5–10% $SiO_2$. Those glasses were at least 100 times, and more preferably were at least 1000 times, more soluble in a particular solvent than soda lime glass.

U.S. Pat. No. 5,100,452 (Dumbaugh, Jr.) describes a further modification of the basic process detailed in Pat. No. 4,102,664. Thus, the patentee was interested in producing a defect-free surface on a glass body which is relatively insoluble in an acid solution, by first coating that glass body with a layer of glass being at least 100 times more soluble in the acid solution than the relatively insoluble glass and exhibiting a linear coefficient of thermal expansion (25°–300° C.) of 65–95×$10^{-7}$/°C., the soluble glass consisting essentially, expressed in terms of cation percent, of 70–85% $B_2O_3$, 7–20% BaO, 0–10% PbO, 0–12% Li$_2$O+Na$_2$O+K$_2$O, 3–15% PbO+Li$_2$O+Na$_2$O+K$_2$O, 0–5% Al$_2$O$_3$, 0–6% CaO, and 0–7% SiO$_2$. The patentee also pointed out five critical parameters that must be observed when selecting the soluble glass.

First, the linear coefficient of thermal expansion will essentially match, or be slightly lower than, that of the durable glass.

Second, the strain point of the glass will be within about 10° C., preferably within about 5° C., of that of the durable glass.

Third, the cladding glass will be at least 100 times more soluble in a particular solvent than the durable glass.

Fourth, the viscosity of the soluble glass must be at least 10 times less than that of the durable glass at the forming temperature.

Fifth, the liquidus of the soluble glass ought to be lower than that of the durable glass.

As has been emphasized above, the presence of an alkali metal is deleterious to the operation of LCD devices and, hence, is to be avoided. Furthermore, because silicon thin film transistors are employed, the linear coefficient of thermal expansion of the substrate glass ought not to be far removed from that of silicon ($\sim$35×10$^{-7}$/°C.). Accordingly, the linear coefficients of thermal expansion (0°–300° C.) of the substrate glass will preferably range about 35–60×10$^{-7}$/°C. To assure defect-free surfaces on the substrate glass and the rapid solution of the soluble glass, the latter will be at least 1000 times more soluble in the solvent than the substrate.

Therefore, a specific objective of the present invention was to design a family of alkali metal-free soluble glass compositions suitable for use with durable glasses having linear coefficients of thermal expansion over the temperature range of 0°–300° C. of about 35–60×10$^{-7}$/°C. and strain points higher than 600° C., preferably higher than 625° C. Thus, the linear coefficients of thermal expansion of the two glasses will be within 5×10$^{-7}$/°C. and, most desirably, will be within about 2×10$^{-7}$/°C. from the setting point of the softer glass to room temperature, and the strain points of the two glasses will be relatively close to each other, i.e., preferably within about 20° C., more preferably within 10° C., and, most preferably, within 5° C. of each other. (As defined herein, the "softer" glass exhibits the lower softening point.)

Alkali metal-free soluble glasses with strain points in excess of 600° C., preferably in excess of 625° C., linear coefficients of thermal expansion (0°–300° C.) between 20–60×10$^{-7}$/°C., and high solubility in acid solutions can be prepared from compositions consisting essentially, expressed in terms of cation percent on the oxide basis, of

| SiO$_2$ | 23–40 | B$_2$O$_3$ | 0–36 | SrO and/or BaO | 0–5 |
| Al$_2$O$_3$ | 15–43 | MgO | 0–7 | ZnO | 0–5 |
| CaO | 5–25 | | | MgO + SrO + BaO + ZnO | 0–10. |

Observance of the composition ranges of the several components is vital to secure glasses demonstrating the desired properties. For example, where the level of SiO$_2$ exceeds 40%, the glasses lose their desired solubility in acid solution. Where the silica content is less than 23%, the glass becomes very susceptible to devitrification and/or the linear coefficient of thermal expansion becomes too high. Where Al$_2$O$_3$ is outside the prescribed range, the glass becomes very subject to devitrification. The presence of CaO is required to impart stability of the glass against devitrification and to adjust physical properties thereof. Where the concentration of B$_2$O$_3$ greater than 36%, the strain point of the glass falls below 600° C. The minor amounts of BaO, MgO, SrO, and ZnO are included to adjust physical properties.

Although it is not mathematically possible to convert ranges in cation percent to exact ranges in weight percent, the values listed below represent approximations of base glass compositions of the inventive soluble glasses expressed in terms of weight percent.

| SiO$_2$ | 27–47 | B$_2$O$_3$ | 0–25 | SrO and/or BaO | 0–10 |
| Al$_2$O$_3$ | 17–41 | MgO | 0–4 | ZnO | 0–7 |
| CaO | 7–25 | | | MgO + SrO + BaO + ZnO | 0–15. |

In a manner similar to that described in Pat. No. 4,102,664, supra, glass sheet having surfaces which are essentially defect-free and equivalent in smoothness to polished surfaces can be fashioned in accordance with the following steps:

(a) two alkali metal-free glass forming batches of different compositions are melted, a batch for a first glass exhibiting a strain point higher than 600° 1 C. which is relatively insoluble in an acid solution and a batch for a second glass consisting essentially, expressed in terms of cation percent on the oxide basis, of

| SiO$_2$ | 23–40 | B$_2$O$_3$ | 0–36 | SrO and/or BaO | 0–5 |
| Al$_2$O$_3$ | 15–43 | MgO | 0–7 | ZnO | 0–5 |
| CaO | 5–25 | | | MgO + SrO + BaO + ZnO | 0–10. | said second glass being at least 1000 times more soluble in the same acid solution and exhibiting (1) a linear coefficient of thermal expansion from its setting point to room temperature within about 5×10$^{-7}$/°C. of that of said first glass;

(2) a strain point higher than 600° C. and relatively close to the strain point of said first glass; and (3) a linear coefficient of thermal expansion over the temperature range of 0°–300° C. between 20–60×10$^{-7}$/°C.;

(b) the molten batches are brought together simultaneously while in the fluid state to form a laminated sheet wherein said first glass is essentially completely enclosed within said second glass;

(c) the laminae are fused together at a temperature where the melts are in fluid form to provide an interface therebetween which is defect-free;

(d) the laminated sheet is cooled to solidify each glass present in fluid form; and thereafter (e) the laminate is contacted with an acid solution to dissolve away said second glass whereby the surfaces of said first glass from which said second glass has been removed is rendered essentially defect-free and is equivalent in smoothness to a polished glass surface.

Whereas the durable glass will desirably be completely enveloped within the soluble glass, it is possible for some very small areas of the sheet, most likely edges thereof, which will not be completely covered. Accordingly, the expression "essentially completely enclosed" has been chosen to indicate that possibility.

As can be recognized, the dissolution of the soluble glass in an acid bath will be carried out after the laminated sheet has arrived at its destination. Thus, sheets cut from the laminate can be stacked and shipped to the fabricator of LCD display devices who will remove the soluble glass immediately prior to its use in the device.

The liquidus values of the two glasses will preferably be below the temperature at which lamination is conducted in order to prevent the occurrence of devitrification during the select forming process.

Finally, in accordance with conventional practice, the laminated sheet may be annealed to avoid any detrimental strains, most preferably during the cooling step, although the cooled laminate may be reheated and thereafter annealed. As has been explained above, the strain points of the present inventive glasses are sufficiently high that annealing may not be required in the formation of a-Si devices.

From economic considerations aqueous solutions of mineral acids such as HCl, $H_2SO_4$, $HNO_3$, and $H_3PO_4$ comprise the preferred solvents, although other solvents including organic acids can also be operable. It is only necessary that the soluble glass be at least 1000 times more soluble in the solution than the durable glass.

Whereas glass compositions within the above-discussed patents and patent applications directed to the manufacture of substrates for use in LCD devices exhibiting strain points higher than 600° C. and preferably higher than 625° C. and linear coefficients of thermal expansion (0°–300° C.) between $35$–$60 \times 10^{-7}/°C$. generally demonstrate excellent resistance to acid solution, a preferred region of glass compositions comprises, expressed in terms of cation percent on the oxide basis, of

| $SiO_2$ | 50–65 | $B_2O_3$ | 0–20 | BaO | 0–10 |
|---|---|---|---|---|---|
| $Al_2O_3$ | 10–20 | CaO | 0–15 | MgO + CaO + | 0–25. |
| MgO | 0–10 | SrO | 0–25 | SrO + BaO | |

Approximations of those ranges in terms of weight percent are set out below:

| $SiO_2$ | 53–60 | $B_2O_3$ | 4–9 | BaO | 0–25 |
|---|---|---|---|---|---|
| $Al_2O_3$ | 11–17 | CaO | 0–25 | MgO + CaO + | 0–32 |
| MgO | 0–7.5 | SrO | 0–40 | SrO + BaO | |

PRIOR ART

The patents discussed above, especially Pat. Nos. 4,102,644, 4,880,453, and 5,100,452, are believed to constitute the most pertinent prior art, the texts of the latter three patents being incorporated herein by reference.

DESCRIPTION OF PREFERRED EMBODIMENTS

Table I records a group of compositions, expressed in terms of cation percent on the oxide basis, of glasses soluble in dilute aqueous mineral acid solutions operable in the present invention. The actual batch ingredients can comprise any materials, either oxides or other components, which, upon being melted together, will be converted into the desired oxide in the proper proportions. To illustrate, $H_3BO_3$ can provide the source of $B_2O_3$ and $CaCO_3$ the source of CaO.

The batch constituents were compounded, tumble mixed together thoroughly to aid in securing a homogeneous melt and charged into platinum crucibles. Lids were placed upon the crucibles which were then introduced into a furnace operating at about 1600° C. After a residence time of about 4 hours, the resulting melt was poured into a steel mold to form a glass slab having dimensions of about $6'' \times 6'' \times 0.5''$ ($\sim 15.25 \times 15.25 \times 1.25$ cm) and that slab transferred immediately to an annealer.

In addition, Table I reports determinations of the strain point (St.P) in ° C. and the linear coefficient of thermal expansion (Exp) over the range 0°–300° C. in terms of $\times 10^{-7}/°C$. as measured in accordance with techniques conventional in the glass art. Table I also lists the weight loss (Loss), expressed in terms of percent, exhibited by the glasses after immersion for four hours, with stirring, in a 5% by weight aqueous solution of HCl operating at 95° C.

Table IA records the same group of glass compositions, but expressed in terms of parts by weight on the oxide basis. Because the sum of the individual ingredients totals or very closely approximates 100, for all practical purposes the individual values reported in Table IA can be considered to represent weight percent.

Whereas the above description reflects a laboratory melting procedure, it will be appreciated that the inventive glasses are capable of being melted and formed employing large scale, commercial glass forming and melting equipment and processes. It is only necessary that the batch ingredients be thoroughly blended together, melted for a sufficient length of time at a high enough temperature to secure a homogeneous melt, and thereafter formed into a glass article.

TABLE I

| | 1 | 2 | 3 | 4 | 5 | 6 |
|---|---|---|---|---|---|---|
| $SiO_2$ | 39.1 | 39.1 | 34.1 | 34.1 | 29.1 | 29.1 |
| $Al_2O_3$ | 27.3 | 27.3 | 32.3 | 37.3 | 22.3 | 37.3 |
| $B_2O_3$ | 25.0 | 25.0 | 20.0 | 15.0 | 35.0 | 15.0 |
| MgO | — | 2.0 | — | — | — | 2.0 |
| CaO | 8.6 | 6.6 | 13.6 | 13.6 | 13.6 | 16.6 |
| St.P | 657 | 660 | 692 | 714 | 619 | 705 |
| Exp | 35.1 | 34.1 | 42.2 | 43.3 | 47.7 | 48.3 |
| Loss | 7.4 | 5.9 | 37 | 25 | 57.8 | 37 |

| | 7 | 8 | 9 | 10 | 11 |
|---|---|---|---|---|---|
| $SiO_2$ | 29.1 | 29.1 | 24.1 | 29.1 | 34.1 |
| $Al_2O_3$ | 37.3 | 37.3 | 42.3 | 42.3 | 17.3 |
| $B_2O_3$ | 15.0 | 20.0 | 5.0 | — | 35.0 |
| MgO | — | 2.0 | 5.0 | 5.0 | — |
| CaO | 16.6 | 9.6 | 23.6 | 23.6 | 13.6 |
| ZnO | 2.0 | 2.0 | — | — | — |
| St.P | 695 | 675 | 716 | 749 | 608 |
| Exp | 48.5 | 41.5 | 58.9 | 54.8 | 47.0 |
| Loss | 39 | 18 | 59 | 58 | 44.2 |

TABLE IA

| | 1 | 2 | 3 | 4 | 5 | 6 |
|---|---|---|---|---|---|---|
| $SiO_2$ | 46.1 | 46.4 | 28.6 | 39.1 | 35.9 | 33.7 |
| $Al_2O_3$ | 27.3 | 27.5 | 42.5 | 31.3 | 23.3 | 36.3 |
| $B_2O_3$ | 17.1 | 17.2 | 13.7 | 9.91 | 25.0 | 10.1 |
| MgO | — | 1.59 | — | — | — | 1.55 |
| CaO | 9.46 | 7.30 | 15.0 | 14.5 | 15.7 | 17.9 |

| | 7 | 8 | 9 | 10 | 11 |
|---|---|---|---|---|---|
| $SiO_2$ | 33.2 | 34.1 | 27.2 | 32.1 | 41.7 |
| $Al_2O_3$ | 36.1 | 37.0 | 40.5 | 39.5 | 17.9 |
| $B_2O_3$ | 9.9 | 13.6 | 3.27 | — | 24.8 |

TABLE IA-continued

| | | | | | |
|---|---|---|---|---|---|
| MgO | — | 1.57 | 3.78 | 3.7 | — |
| CaO | 17.7 | 10.5 | 24.8 | 24.3 | 15.5 |
| ZnO | 3.09 | 3.17 | — | — | — |

Table II presents a group of compositions, expressed in terms of cation percent on the oxide basis, of glasses relatively insoluble in dilute aqueous mineral acid solutions operable in the subject invention. In like manner to the glass compositions set out above in Table I, the actual batch constituents can comprise any materials, either oxides or other compounds, which, upon being melted together, will be covered into the desired oxide in the proper proportions.

The batch ingredients were compounded, tumble mixed together thoroughly to aid in obtaining a homogeneous melt, and charged into platinum crucibles. After placing lids thereon, the crucibles were moved into a furnace operating at about 1600° C., were maintained within the furnace for about 16 hours, and the resulting melts poured into steel molds to form glass slabs having dimensions of about 6"×6"×0.5" (~15.25×15.25×1.25 cm), which slabs were transferred immediately to an annealer.

Table II also records values of the strain point (St.P) in terms of ° C. and the linear coefficient of thermal expansion (Exp) over the range 0°–300° C. in terms of $\times 10^{-7}$°C. as determined in accordance with measuring techniques conventional in the glass art. Table I further lists the weight loss (Loss), expressed in terms of mg/cm$^2$, after immersion for 24 hours in a 5% by weight aqueous solution of HCl operating at 95° C.

Table IIA lists the same group of glass compositions, but expressed in terms of parts by weight on the oxide basis. Inasmuch as the sum of the individual components totals or very closely approximates 100, for all practical purposes the individual values recorded in Table IIA can be deemed to reflect weight percent.

Again in like manner to the glasses reported in Table I, it will understood that the above description relates to a laboratory melting and forming procedure. The glass compositions, however, are capable of being melted and formed utilizing large scale, commercial glass melting and forming equipment and processes.

TABLE II

| | 12 | 13 | 14 | 15 |
|---|---|---|---|---|
| SiO$_2$ | 55.3 | 54.5 | 57.6 | 63.9 |
| Al$_2$O$_3$ | 18.8 | 18.5 | 17.3 | 14.8 |
| B$_2$O$_3$ | 13.9 | 8.0 | 8.13 | — |
| MgO | 3.05 | 8.0 | — | — |
| CaO | 4.29 | 8.0 | 12.0 | — |
| SrO | 1.05 | — | — | 21.3 |
| BaO | 3.59 | 3.0 | 4.94 | — |
| St.P | 676 | 675 | 671 | 718 |
| Exp | 38.6 | 43.5 | 48.8 | 58.4 |
| Loss | 0.9 | 0.25 | 0.11 | 0.03 |

TABLE IIA

| | 12 | 13 | 14 | 15 |
|---|---|---|---|---|
| SiO$_2$ | 57.3 | 57.2 | 56.8 | 56.4 |
| Al$_2$O$_3$ | 16.5 | 16.5 | 14.6 | 11.1 |
| B$_2$O$_3$ | 8.35 | 4.86 | 4.43 | — |
| MgO | 2.12 | 5.63 | — | — |
| CaO | 4.15 | 7.83 | 11.0 | — |
| SrO | 1.88 | — | <0.3* | 32.4 |
| BaO | 9.5 | 8.03 | 12.4 | — |
| As$_2$O$_3$** | 0.8 | — | 0.75 | — |

*SrO present as an impurity in the BaO batch material.
**As$_2$O$_3$ present as a fining agent.

The solubility loss of the glasses set out in Table II on a weight percent basis would be on the order of 0.01–0.3%. Nevertheless, it must be recognized that their dwell time in the bath of dilute acid was six times longer than the glass of Table I.

Although the thrust of the present invention contemplates the essential total envelopment of the durable glass sheet within a soluble glass, it will be appreciated that the streams of durable glass and soluble glass can be brought together in a manner wherein one side only of the durable glass is covered. For example, glass sheet of very precise flatness can be prepared by bringing the streams of glass together such that the soluble glass is brought underneath the durable glass and, while in a relatively fluid form, the laminate is laid atop a flat surface to cool and assume a flat configuration. The soluble glass can then be dissolved away leaving a defect-free surface. The upper surface of the durable glass is not subject to abuse, it being exposed to air only. The thermal expansions of the two glasses must match almost exactly in order to avoid warpage or other deformation.

I claim:

1. A method for preparing a glass sheet having surfaces which are essentially defect-free and equivalent in smoothness to polished glass surfaces which comprises the steps of:
    (a) two alkali metal free glass forming batches of different compositions are melted, one batch is for a first glass exhibiting a strain point higher than 600° C. which is relatively insoluble in an acid solution and the second batch is for a second glass consisting essentially, expressed in terms of cation percent on the oxide basis, of

| | | | | | |
|---|---|---|---|---|---|
| SiO$_2$ | 23–40 | B$_2$O$_3$ | 0–36 | SrO and/or BaO | 0–5 |
| Al$_2$O$_3$ | 15–43 | MgO | 0–7 | ZnO | 0–5 |
| CaO | 5–25 | | | MgO + SrO + BaO + ZnO | 0–10 | said second glass being at least 1000 times more soluble in the same acid solution and exhibiting
    (1) a linear coefficient of thermal expansion from its setting point to room temperature within about $5 \times 10^{-7}$/°C. of that of said first glass;
    (2) a strain point higher than 600° C. and relatively close to the strain point of said first glass; and
    (3) a linear coefficient of thermal expansion over the temperature range 0°–300° C. between $20–60 \times 10^{-7}$/°C.;
(b) the molten batches are brought together simultaneously while in the molten state to form a laminated sheet wherein said first glass is essentially completely enclosed within said second glass;
(c) said laminated sheet is cooled to solidify each glass present in molten form; and thereafter
(d) said laminate is contacted with an acid solution to dissolve away said second glass whereby the surface of said first glass from which said second glass has been removed is rendered essentially defect-free and is equivalent in smoothness to a polished glass surface.

2. A method according to claim 1 wherein said acid solution is a mineral acid.

3. A method according to claim 1 wherein said first glass exhibits a linear coefficient of thermal expansion over the temperature range 0°–300° C. between $35$–$60 \times 10^{-7}$/°C.

4. A method according to claim 1 wherein said first glass consists essentially, expressed in terms of cation percent on the oxide basis, of

| | | | | | | |
|---|---|---|---|---|---|---|
| $SiO_2$ | 50–65 | $B_2O_3$ | 0–20 | BaO | | 0–10 |
| $Al_2O_3$ | 10–20 | CaO | 0–15 | MgO + CaO + | | 0–25 |
| MgO | 0–10 | SrO | 0–25 | SrO + BaO | | |

5. A method according to claim 1 wherein the strain point of said first glass and the strain point of said second glass are both higher than 625° C.

6. A method according to claim 1 wherein the strain point of said second glass is within about 20° C. of the strain point of said first glass.

* * * * *